(12) United States Patent
Zhang et al.

(10) Patent No.: US 12,197,338 B2
(45) Date of Patent: Jan. 14, 2025

(54) DATA FEATURE DETECTION AND REPLACEMENT IN USER-WRITTEN DATA FOR CACHING

(71) Applicant: Dell Products L.P., Round Rock, TX (US)

(72) Inventors: Weibing Zhang, Beijing (CN); Lei Gao, Beijing (CN); Donglei Wang, Beijing (CN); Shuning Zhang, Beijing (CN); Jianping Song, Beijing (CN)

(73) Assignee: Dell Products L.P., Round Rock, TX (US)

( * ) Notice: Subject to any disclaimer, the term of this patent is extended or adjusted under 35 U.S.C. 154(b) by 78 days.

(21) Appl. No.: 18/106,559

(22) Filed: Feb. 7, 2023

(65) Prior Publication Data

US 2024/0028519 A1    Jan. 25, 2024

(30) Foreign Application Priority Data

Jul. 22, 2022    (CN) .......................... 202210868512.4

(51) Int. Cl.
*G06F 12/00* (2006.01)
*G06F 12/0875* (2016.01)

(52) U.S. Cl.
CPC ...... *G06F 12/0875* (2013.01); *G06F 2212/45* (2013.01)

(58) Field of Classification Search
CPC ............. G06F 12/0875; G06F 2212/45; G06F 3/0608; G06F 3/061; G06F 3/0673;

(Continued)

(56) References Cited

U.S. PATENT DOCUMENTS

2012/0066458 A1\*  3/2012  Chiba .................... G06F 3/065
                                                          711/E12.001
2013/0232284 A1\*  9/2013  Akiyama .............. G06F 3/0659
                                                          710/23

(Continued)

FOREIGN PATENT DOCUMENTS

EP              1132914 A2 \*  9/2001   ....... G11B 20/00086

OTHER PUBLICATIONS https://www.intel.com/content/www/us/en/products/network-io/smartnic.html, Intel, Oct. 19, 2020. Retrieved from the internet Dec. 7, 2023.

(Continued)

*Primary Examiner* — Mardochee Chery
(74) *Attorney, Agent, or Firm* — BainwoodHuang

(57) ABSTRACT

Techniques for data processing involve: performing, according to a determination that a programmable circuit receives user-written data, data feature detection by the programmable circuit on a first part of the user-written data. Such techniques further involve: replacing, in response to the first part matching a predetermined data feature, the first part by the programmable circuit with a data representation corresponding to the predetermined data feature. In addition, such techniques involve: writing the data representation to a cache region of a storage system. Accordingly, such techniques can save cache resources of a storage system and can save CPU of the storage system, thus avoiding the latency due to data feature detection and improving the user experience.

20 Claims, 6 Drawing Sheets

(58) Field of Classification Search
CPC ..... G06F 2212/1024; G06F 2212/1041; G06F 2212/313; G06F 12/0888; G06F 12/0871; G06F 3/0641; G06F 9/5016; G06F 9/5027
USPC ........................................................ 711/118
See application file for complete search history.

(56) References Cited

U.S. PATENT DOCUMENTS

| | | |
|---|---|---|
| 2017/0309343 A1* | 10/2017 | Lim .................... G06F 12/1009 |
| 2019/0332301 A1 | 10/2019 | Yang et al. |
| 2020/0142628 A1 | 5/2020 | Armangau et al. |
| 2022/0179830 A1 | 6/2022 | Pu |

OTHER PUBLICATIONS https://codilime.com/blog/what-are-smartnics-the-different-types-and-features/, Codilime 2023, retrieved from the internet Dec. 7, 2023.
https://www.storagereview.com/news/smartnics-will-radically-change-the-data-center. Tom Fenton, Mar. 19, 2021. Retrieved from the internet Dec. 7, 2023.

* cited by examiner

DATA FEATURE DETECTION AND REPLACEMENT IN USER-WRITTEN DATA FOR CACHING

CROSS-REFERENCE TO RELATED APPLICATION

This application claims priority to Chinese Patent Application No. CN202210868512.4, on file at the China National Intellectual Property Administration (CNIPA), having a filing date of Jul. 22, 2022 and having "DATA PROCESSING METHOD, ELECTRONIC DEVICE AND COMPUTER PROGRAM PRODUCT" as a title, the contents and teachings of which are herein incorporated by reference in their entirety.

TECHNICAL FIELD

Embodiments of the present disclosure relate to the field of computers, and more particularly, to a method, an electronic device, and a computer program product for data processing.

BACKGROUND

Data feature detection technology is a function used in many storage systems to perform data de-duplication. This function may identify a set of statically predefined data features. For example, if a user I/O data stream consists of all-0 or all-1 data parts, these data parts will not be written directly to a disk. To implement data de-duplication, a storage system will use simplified data to replace the all-0 or all-1 data parts. In other words, the storage system will detect a predetermined data feature in the memory and does not allocate memory for data parts that are in conformity with the predetermined data features, but simply updates corresponding metadata. However, the process of data feature detection itself requires consumption of memory and CPU, and thus may introduce latency in the data writing and reading processes.

SUMMARY OF THE INVENTION

The embodiments of the present disclosure provide a solution for data processing.

In a first aspect of the present disclosure, a data processing method is provided. The method may include: performing, according to a determination that a programmable circuit receives user-written data, data feature detection by the programmable circuit on a first part of the user-written data. The method may further include: replacing, in response to the first part matching a predetermined data feature, the first part by the programmable circuit with a data representation corresponding to the predetermined data feature. In addition, the method may include: writing the data representation to a cache region of a storage system.

In a second aspect of the present disclosure, an electronic device is provided, which includes a processor; and a memory coupled to the processor and having instructions stored therein, wherein the instructions, when executed by the processor, cause the electronic device to perform actions including: performing, according to a determination that a programmable circuit receives user-written data, data feature detection by the programmable circuit on a first part of the user-written data; replacing, in response to the first part matching a predetermined data feature, the first part by the programmable circuit with a data representation corresponding to the predetermined data feature; and writing the data representation to a cache region of a storage system.

In a third aspect of the present disclosure, a computer program product is provided. The computer program product is tangibly stored on a computer-readable medium and includes machine-executable instructions, and the machine-executable instructions, when executed, cause a machine to execute any step of the method according to the first aspect.

The Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

DESCRIPTION OF THE DRAWINGS

Example embodiments of the present disclosure are described in more detail with reference to the accompanying drawings, the above and other objectives, features, and advantages of the present disclosure will become more apparent, and identical or similar reference numbers generally represent identical or similar components in the example embodiments of the present disclosure. In the drawings.

DETAILED DESCRIPTION

Figure 1:
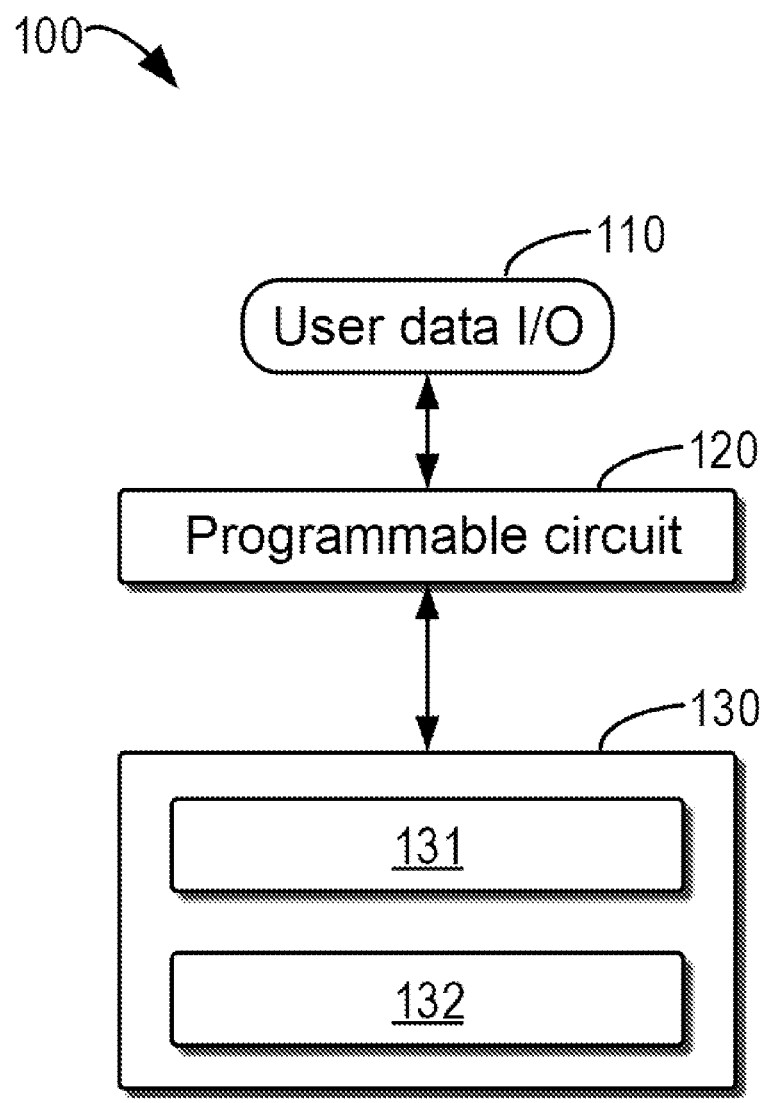
FIG. 1 illustrates a schematic diagram of an example environment according to an embodiment of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principles of the present disclosure will be described below with reference to several example embodiments illustrated in the accompanying drawings.

As used herein, the term "include" and variations thereof mean open-ended inclusion, that is, "including but not limited to." Unless specifically stated, the term "or" means "and/or." The term "based on" means "based at least in part on." The terms "an example embodiment" and "an embodiment" indicate "a group of example embodiments." The term "another embodiment" indicates "a group of other embodiments." The terms "first," "second," and the like may refer to different or identical objects. Other explicit and implicit definitions may also be included below.

In addition, the "data feature" mentioned herein is used to indicate a particular feature of a set of data of a particular number of bytes. As an example, data "00000000" has a particular feature and can thus be determined as a data feature. Similarly, data "01011010" may also be determined as a data feature. The term "metadata" mentioned herein is used to indicate information such as a data feature that the corresponding user data has and the location of the user data. It should be understood that embodiments of the present disclosure may be described below by way of particular examples which are not intended to limit the scope of protection of the present disclosure.

As discussed above, since there is a need to perform de-duplication processing on user data I/O, it is necessary to allocate an I/O cache for all the user data and deliver it through an I/O stack, thus requiring consumption of a certain amount of CPU and cache. As an example, the storage system may sample the user data at a predetermined length of bytes. For example, sampling and detecting may be performed for every 8 KB of user data. However, the detection process usually affects the CPU usage. For example, if the sampling detection is passed, a hash lookup detection may be performed on the 8 KB of user data, and if the hash lookup is passed, a bit-by-bit comparison between the entire 8 KB of user data and a predetermined data pattern is performed. It should be understood that the sampling comparison and the hash lookup are fast and have a small impact on the CPU, but the bit-by-bit comparison may have a significant impact on the CPU. In the worst case, if all the user data passes the sampling detection and hash lookup detection, but fails in the bit-by-bit comparison after entering the bit-by-bit comparison, the overall writing performance of the entire storage system may be affected.

In order to solve, at least in part, the above problem, an embodiment of the present disclosure provides a novel solution for data processing. First, the data feature detection is not performed on the CPU; instead, the data feature detection is performed by creating a programmable circuit. Second, a "data representation" (a descriptor of a data feature) may be generated without allocating a buffer cache for the data. If a data part of this predetermined length of bytes does not match any predetermined data feature, the data part of this predetermined length of bytes is allocated directly to a cache region of the storage system. The "data representation" and the cache region will be linked to a cache list. The cache list is then transmitted through the I/O path of the storage system, so the storage system only needs to update metadata associated with the data feature as it is written to the disk. With this design, the I/O cache will be saved, and the process of data feature detection will not become a burden on the CPU.

FIG. 1 illustrates a schematic diagram of an example environment according to an embodiment of the present disclosure. In this example environment 100, a device and/or a process according to embodiments of the present disclosure may be implemented. As shown in FIG. 1, example environment 100 may include programmable circuit 120 and storage system 130. It should be understood that programmable circuit 120 may also be designed to be part of storage system 130 or be integrated within storage system 130.

In FIG. 1, programmable circuit 120 replaces the CPU in storage system 130 to receive user data I/O from a user and to perform data feature detection on the user data. It should be understood that programmable circuit 120 may be any circuit module, such as an FPGA, with functions that can be customized by the user through programming. During data feature detection, if a part of the user-written data matches a particular data feature, programmable circuit 120 may replace that part of the user-written data using a data representation corresponding to that particular data feature based on a predetermined rule. As a result, this feature representation, rather than that part of the user-written data itself, will be transmitted to cache region 131 within storage system 130. Further, the feature representation and a part of the user-written data that does not match any other particular data feature are written to storage region 132 within storage system 130.

In some embodiments, the CPU in storage system 130 may be replaced by any device with computing capability, for example, any type of fixed computing device or mobile computing device, including but not limited to a desktop computer, a laptop computer, a notebook computer, a tablet computer, and the like.

In some embodiments, storage region 132 may include memories at least for storing structured data that has been processed. These memories may be replaced by various other types of devices with a storage function, including but not limited to a hard disk drive (HDD), a solid state drive (SSD), a removable disk, any other magnetic storage device and any other optical storage device, or any combination thereof.

Since the amount of data of the feature representation used to replace the part of user-written data is usually much smaller than the part of user-written data itself, cache resources of the storage system are saved. Further, because programmable circuit 120 bears the data feature detection task of the CPU of storage system 130, the CPU of the storage system is saved, thus avoiding the latency due to the data feature detection and improving the user experience.

The process of data processing according to an embodiment of the present disclosure will be described in detail below in connection with FIG. 2. For ease of understanding, the specific data mentioned in the following description are all illustrative and are not intended to limit the scope of protection of the present disclosure. It should be understood that the embodiment described below may also include additional actions not shown and/or may omit actions shown, and the scope of the present disclosure is not limited in this regard.

Figure 2:
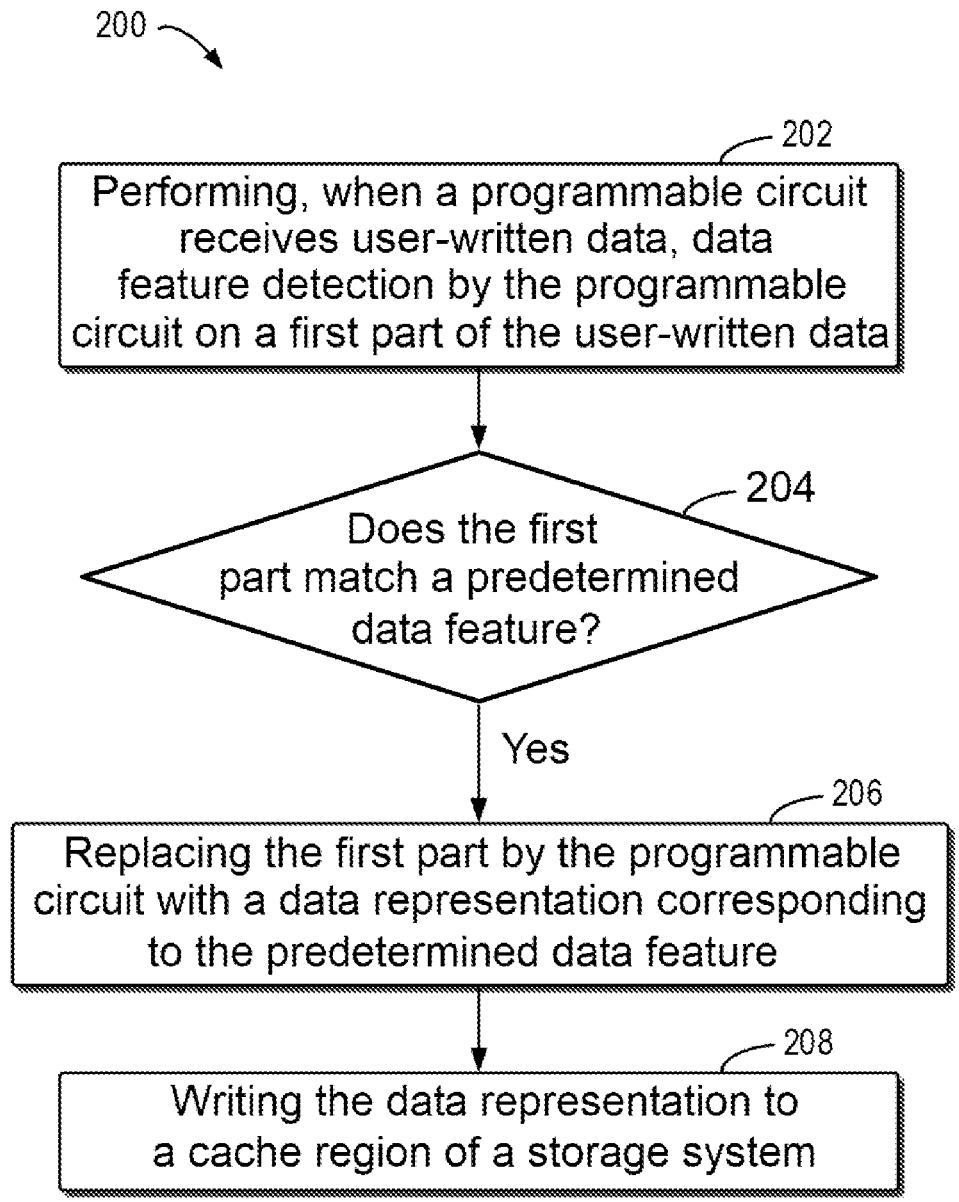
FIG. 2 illustrates a flow chart of a process for data processing according to an embodiment of the present disclosure.

FIG. 2 illustrates a flow chart of process 200 for data processing according to an embodiment of the present disclosure. Process 200 for data processing according to the embodiment of the present disclosure is now described with reference to FIG. 3. For ease of understanding, specific examples mentioned in the following description are all illustrative and are not intended to limit the protection scope of the present disclosure.

As shown in FIG. 2, at 202, when programmable circuit 120 receives user-written data, programmable circuit 120 may perform data feature detection on a part of the user-written data. In some embodiments, programmable circuit 120 may be implemented by a smart network card (Smart-NIC). Smart network card is a programmable accelerator that makes server networks more secure and the storage more efficient and flexible. The smart network card bears from the CPU of the storage system a large number of tasks required to manage modern applications with software-based network functions. The smart network card is typically designed with a fixed-function hardware engine and can accelerate many different workloads compared with conventional functional network interface cards. For storage system 130, the smart network card may also be programmed to handle storage access protocol functions. Thus, the smart network card may be used as programmable circuit 120 to perform the data feature detection.

When a data writing request is received from a user, programmable circuit 120 will process the I/O request using a predetermined storage access protocol. The data feature detection will then be performed in programmable circuit 120. It should be understood that programmable circuit 120 may be a circuit module, such as an FPGA, with functions that are customized by a user through programming, so that the sampling of the user-written data and subsequent data feature detection tasks can be processed quickly and almost "transparently." As a result, the CPU of storage system 130 can be released for other I/O processing, thereby reducing processing latency.

Figure 3:
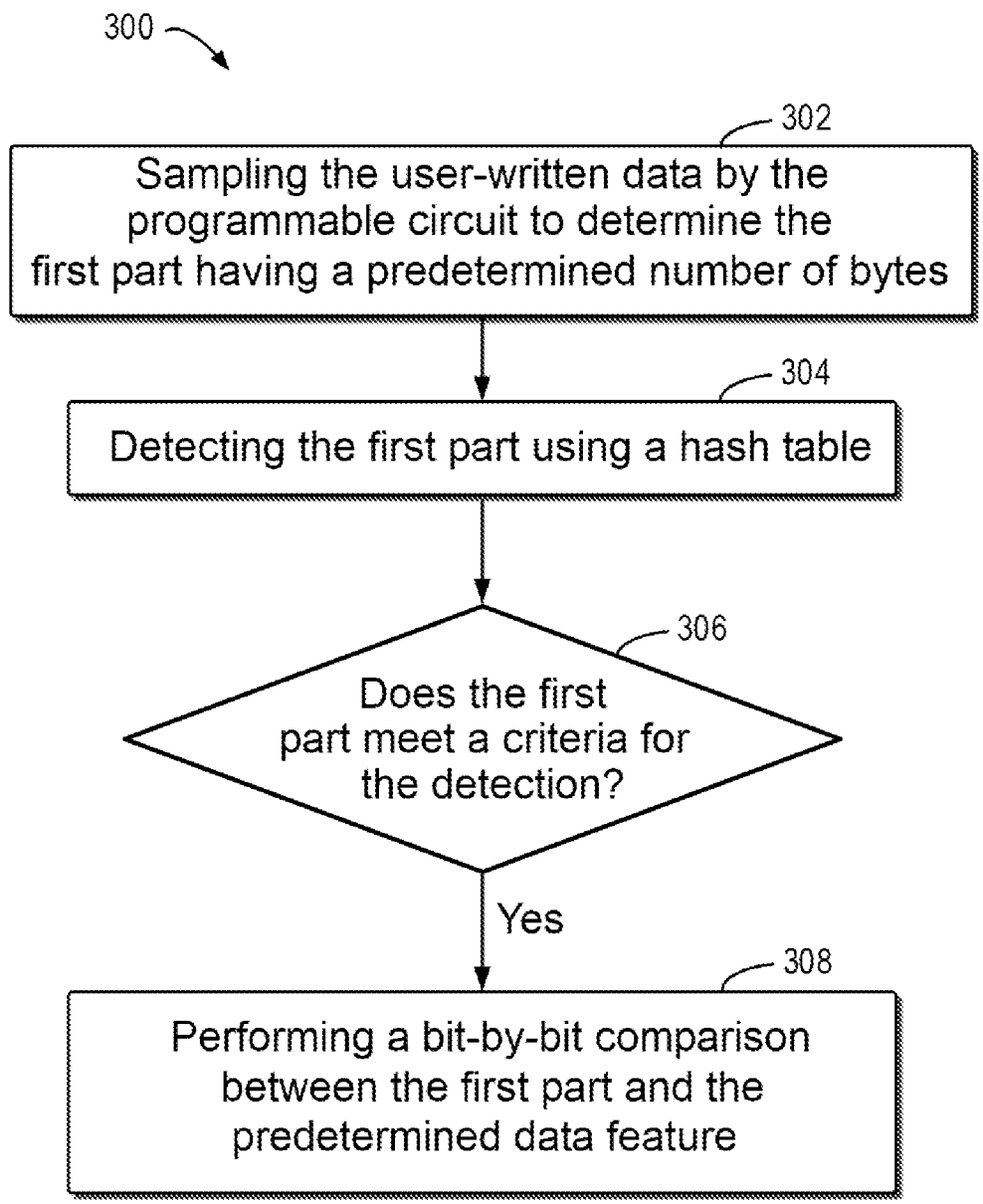
FIG. 3 illustrates a flow chart of a process for data processing according to an embodiment of the present disclosure.

To demonstrate the specific process of the data feature detection by programmable circuit 120, a detailed description will be provided below with reference to FIG. 3. FIG. 3 illustrates a flow chart of process 300 for data processing according to an embodiment of the present disclosure. In some embodiments, process 300 may be implemented in programmable circuit 120 in FIG. 1. Process 300 for data processing according to the embodiment of the present disclosure is now described with reference to FIG. 3. For ease of understanding, specific examples mentioned in the following description are all illustrative and are not intended to limit the protection scope of the present disclosure.

As shown in FIG. 3, at 302, programmable circuit 120 may sample the user-written data to determine the part of user-written data that has a predetermined number of bytes. As an example, programmable circuit 120 may sequentially intercept a predetermined length, such as 8 KB, of data from the user-written data. Afterwards, at 304, programmable circuit 120 may detect the part of user-written data using a hash table, and at 306, programmable circuit 120 determines whether the part of user-written data meets a criteria for the detection. If that part of user-written data does not meet the criteria for the detection, that part of user-written data is transmitted directly to cache region 131 of storage system 130, or if that part of user-written data meets the criteria for the detection, the process proceeds to 308. At 308, programmable circuit 120 may perform a bit-by-bit comparison between that part of user-written data and a predetermined data feature.

Returning to FIG. 2, at 204, programmable circuit 120 determines whether that part of user-written data matches the predetermined data feature, and upon determining that the two match, the process proceeds to 206. At 206, programmable circuit 120 may replace the part of user-written data with a data representation corresponding to the above predetermined data feature. In some embodiments, an "information box" may be created for the data representation in order to replace the user-written data with the data representation. The data structure of the "information box" is intended to transmit information about detected metadata related to a data feature. The "information box" carries the key of the data feature and the corresponding data feature itself, which are used to identify the data feature and to extend the data feature to storage region 132. It should be noted that the key of the data feature or the corresponding information box may be equivalent to the data representation mentioned herein.

Afterwards, at 208, this data representation will be transmitted to cache region 131 of storage system 130.

Afterwards, programmable circuit 120 may also perform data feature detection on another part of the user-written data. In some embodiments, if this another part of user-written data does not match any predetermined data feature, programmable circuit 120 may transmit this another part of user-written data directly to cache region 131.

On this basis, this data representation and this another part of user-written data in cache region 131 are transmitted to storage region 132 of storage system 130, and storage system 130 may mark metadata associated with this part of user-written data in storage region 132 based on this data representation.

Figure 4:
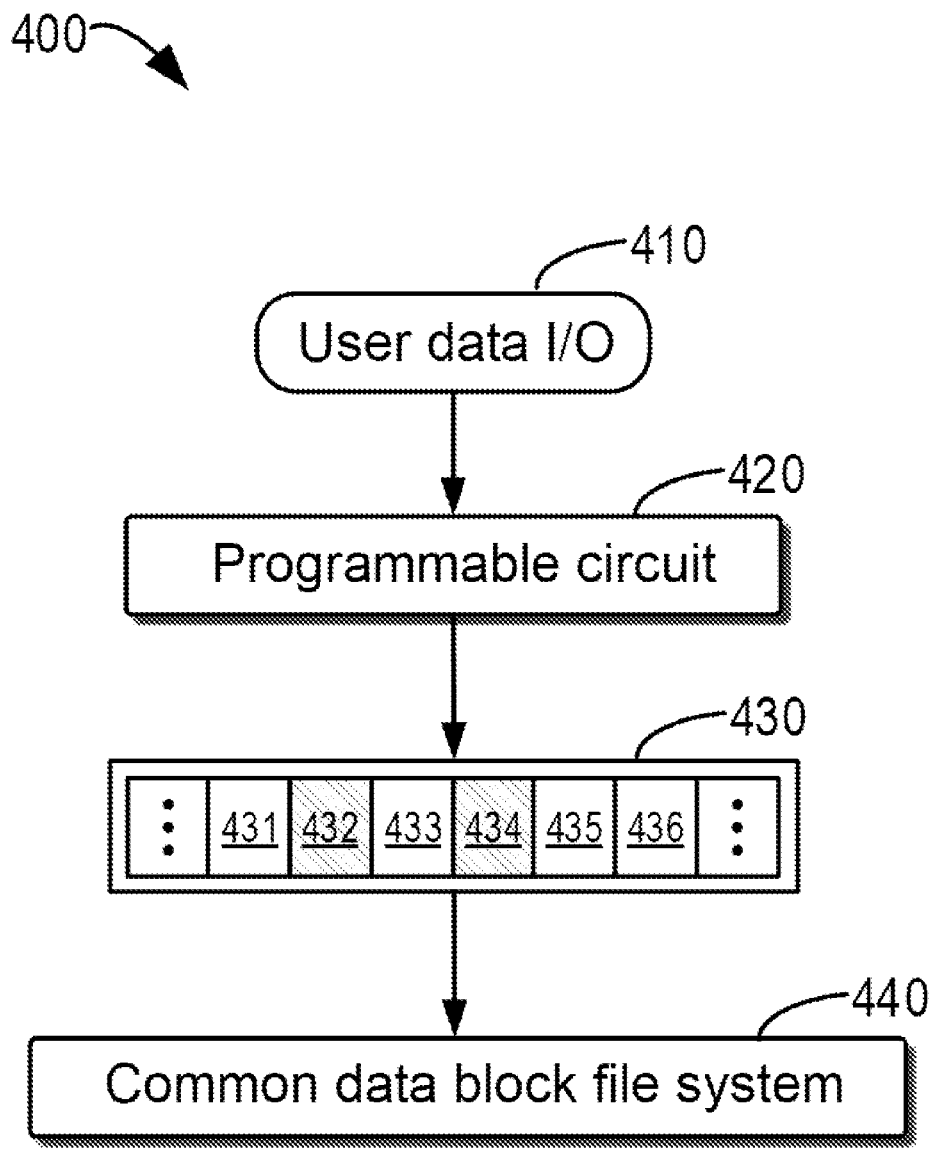
FIG. 4 illustrates a schematic diagram of an example environment for data writing according to an embodiment of the present disclosure.

The above processing process will now be described more clearly with reference to FIG. 4. FIG. 4 illustrates a schematic diagram of example environment 400 for data writing according to an embodiment of the present disclosure. As shown in FIG. 4, programmable circuit 420 receives user data I/O (i.e., user-written data) 410 from a user and performs data feature detection on the user data. During the data feature detection, if a part of the user-written data does not match a particular data feature, programmable circuit 420 may write that part of data directly to cache region 430. In FIG. 4, data blocks 431, 433, 435, and 436 are all written directly to cache region 430 since they do not match any particular data feature.

In addition, if a part of the user-written data matches a particular data feature, programmable circuit 420 may replace that part of user-written data using a data representation corresponding to that particular data feature based on a predetermined rule. As a result, this feature representation, rather than that part of user-written data itself, will be transmitted to cache region 131 within storage system 130. In FIG. 4, both information boxes 432 and 434 are written to cache region 430 because their corresponding data blocks match the particular data feature. The information box carries the key of the data feature and the corresponding data feature itself, which are used to identify the data feature and to extend the data feature to storage region 132.

In some embodiments, as shown in FIG. 4, in order to transmit the data representation and the another part of user-written data to storage region 132, the data representation may be transmitted at least via an IO stack of storage system 130 to common data block file system module 440 of storage system 130 that is used for de-duplication processing.

Figure 5:
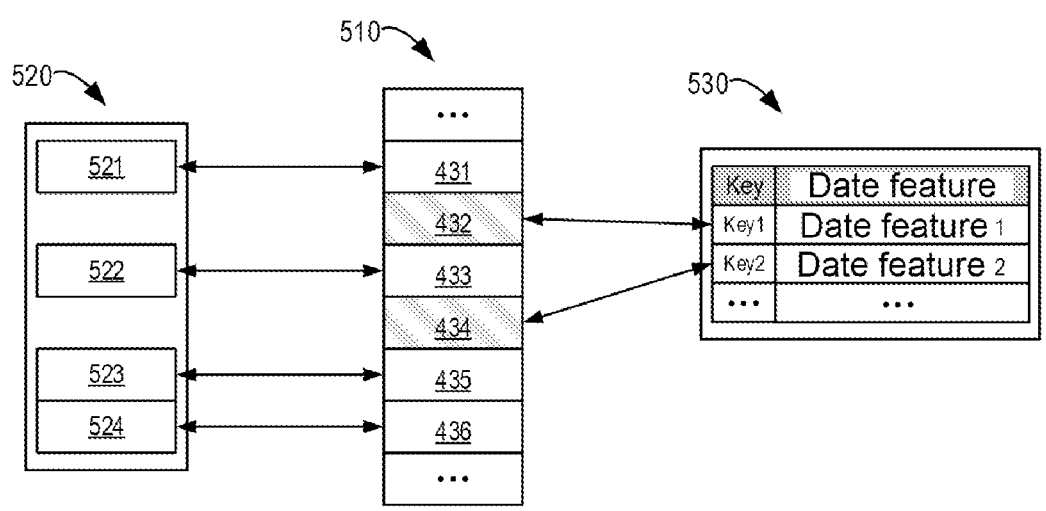
FIG. 5 illustrates a schematic diagram of the relationship between a storage pool, a cache list, and a key-feature table according to an embodiment of the present disclosure.

FIG. 5 illustrates a schematic diagram of the relationship between storage pool 520, cache list 510, and key-feature table 530 according to an embodiment of the present disclosure. As shown in FIG. 5, cache list 510 is the data blocks and information boxes that are written to the cache region in FIG. 4. In FIG. 5, data blocks 431, 433, 435, and 436 are associated with allocated memories 521, 522, 523, and 524 in storage pool 520, respectively. Further, in FIG. 5, information boxes 432 and 434 are associated with keys Key1 and Key2 in key-feature table 530, respectively. As an example, storage system 130 maintains key-feature table 530 such that information boxes 432 and 434 may represent or replace corresponding data feature 1 and data feature 2 in key-feature table 530. It should be understood that the information boxes are used for a read path and a write path. In the write path, the information box carries a data feature key that will be converted to special metadata within an indirect block of the storage system. In the read path (to be described in detail later), this data feature key carries the specific content of the data feature, and that specific content may be expanded into a complete data segment that is to be populated into a read reply message.

In some embodiments, as shown in FIG. 5, this data representation (i.e., Key1 and Key2 corresponding to information boxes 432 and 434, respectively) and the another part of user-written data (i.e., data blocks 431, 433, 435, and 436) are stored in cache list 510 in cache region 131.

In some embodiments, as shown in FIG. 5, the predetermined data features (i.e., data feature 1 and data feature 2) and the corresponding data representations (i.e., Key1 and Key2) are maintained in key-feature table 530.

In some embodiments, when the user desires to read the corresponding data, after a user read request is received, metadata in storage region 132 that is associated with read data indicated by the user read request may be detected. If the storage region includes marked "special" metadata, the data representation corresponding to the above part of user-written data is determined based on the marked metadata, and data population may be performed based on this data representation to finally obtain the read data.

With the above embodiment, memory resources will be stored in the I/O path. When the written data matches the predetermined data feature, an "information box" may be generated to transmit information without allocating memory for the writing request for that data. In this way, memory resources may be saved for other storage functions to improve the overall storage system performance. In addition, the data feature detection operation is transferred from CPU to the programmable circuit, thus releasing CPU resources of the storage system for other storage functions to improve the overall storage system performance.

Figure 6:
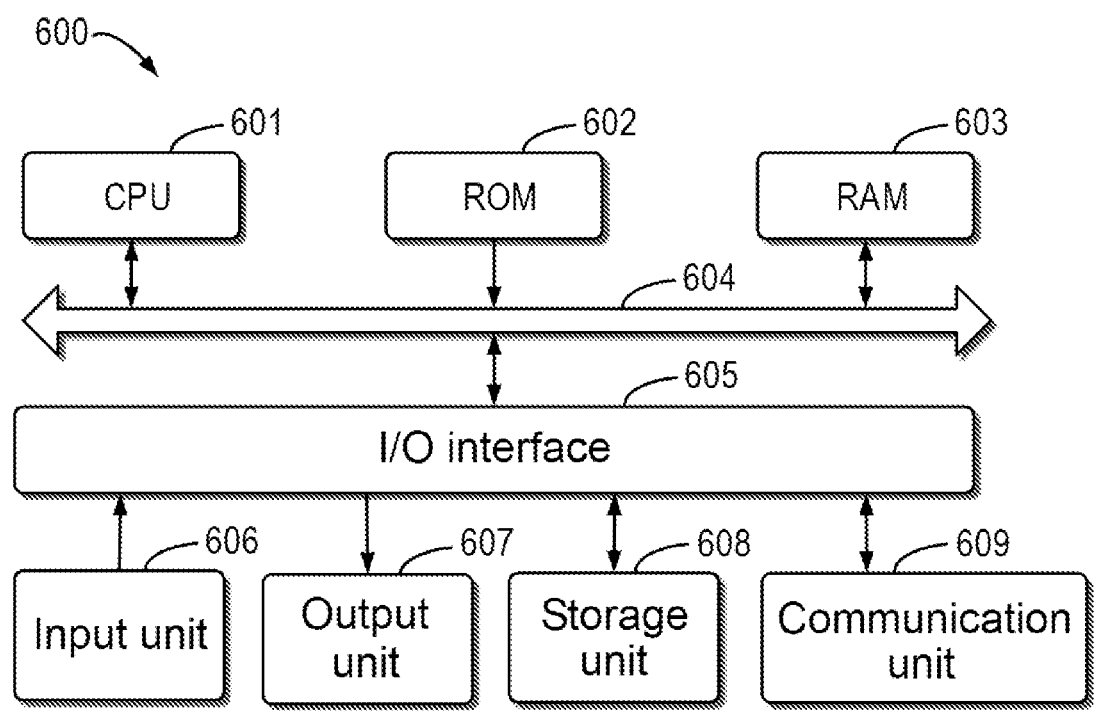
FIG. 6 illustrates a block diagram of an example device that may be used to implement embodiments of the present disclosure.

FIG. 6 is a block diagram of example device 600 that may be configured to implement embodiments of the present disclosure. As shown in the drawing, electronic device 600 includes a central processing unit (CPU) 601 that may perform various appropriate actions and processing according to computer program instructions stored in read-only memory (ROM) 602 or computer program instructions loaded from storage unit 608 into random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

Processing unit 601 performs the various methods and processing described above, such as processes 200 and 300. For example, in some embodiments, the various methods and processing described above may be implemented as a computer software program or a computer program product, which is tangibly included in a machine-readable medium, such as storage unit 608. In some embodiments, part of or all the computer program may be loaded and/or installed onto device 600 via ROM 602 and/or communication unit 609. When the computer program is loaded into RAM 603 and executed by CPU 601, one or a plurality of steps of any process described above may be implemented. Alternatively, in other embodiments, CPU 601 may be configured in any other suitable manners (for example, by means of firmware) to perform a process such as processes 200 and 300.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, any non-transitory storage device, or any appropriate combination described above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a particular manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Various implementations of the present disclosure have been described above. The foregoing description is illustrative rather than exhaustive, and is not limited to the disclosed implementations. Numerous modifications and alterations are apparent to persons of ordinary skill in the art without departing from the scope and spirit of the illustrated implementations. The selection of terms used herein is intended to best explain the principles and practical applications of the implementations or the improvements to technologies on the market, or to enable other persons of ordinary skill in the art to understand the implementations disclosed herein.

The invention claimed is:

1. A data processing method, comprising:
performing, according to a determination that a programmable circuit receives user-written data, data feature detection by the programmable circuit on a first part of the user-written data;
replacing, in response to the first part matching a predetermined data feature, the first part by the programmable circuit with a data representation corresponding to the predetermined data feature; and
transmitting the data representation to a cache region of a storage system.

2. The method according to claim 1, further comprising:
causing the programmable circuit to perform data feature detection on a second part of the user-written data; and
transmitting the second part to the cache region in response to the second part not matching the predetermined data feature.

3. The method according to claim 2, further comprising:
transmitting at least the data representation and the second part included in the cache region to a storage region of the storage system; and
marking metadata in the storage region that is associated with the first part based on the data representation.

4. The method according to claim 3, further comprising:
detecting, according to a determination that a user read request is received, metadata in the storage region that is associated with read data indicated by the user read request;
determining, in response to the storage region comprising marked metadata, the data representation corresponding to the first part based on the marked metadata; and
determining the read data based at least on the data representation.

5. The method according to claim 3, wherein transmitting the data representation and the second part to the storage region comprises:
transmitting the data representation via an IO stack of the storage system to a common data block file system module of the storage system that is used for de-duplication processing.

6. The method according to claim 2, wherein the data representation and the second part are stored in a cache list in the cache region.

7. The method according to claim 1, wherein performing data feature detection by the programmable circuit on the first part comprises:

sampling the user-written data by the programmable circuit to determine the first part having a predetermined number of bytes;

detecting the first part using a hash table; and performing a bit-by-bit comparison between the first part and the predetermined data feature in response to the first part meeting a criteria for the detection.

8. The method according to claim 1, wherein the programmable circuit is implemented by a smart network card.

9. The method according to claim 1, wherein the predetermined data feature and the corresponding data representation are maintained in a predetermined list.

10. The method according to claim 1, further comprising: receiving, by the programmable circuit, the user-written data in a data writing request from a user.

11. An electronic device, comprising:

a processor; and a memory coupled to the processor and having instructions stored therein, wherein the instructions, when executed by the processor, cause the electronic device to perform actions comprising:

performing, according to a determination that a programmable circuit receives user-written data, data feature detection by the programmable circuit on a first part of the user-written data;

replacing, in response to the first part matching a predetermined data feature, the first part by the programmable circuit with a data representation corresponding to the predetermined data feature; and transmitting the data representation to a cache region of a storage system.

12. The device according to claim 11, wherein the actions further comprise:

causing the programmable circuit to perform data feature detection on a second part of the user-written data; and transmitting the second part to the cache region in response to the second part not matching the predetermined data feature.

13. The device according to claim 11, wherein the actions further comprise:

transmitting at least the data representation and the second part included in the cache region to a storage region of the storage system; and marking metadata in the storage region that is associated with the first part based on the data representation.

14. The device according to claim 13, wherein the actions further comprise:

detecting, according to a determination that a user read request is received, metadata in the storage region that is associated with read data indicated by the user read request;

determining, in response to the storage region comprising marked metadata, the data representation corresponding to the first part based on the marked metadata; and determining the read data based at least on the data representation.

15. The device according to claim 13, wherein transmitting the data representation and the second part to the storage region comprises:

transmitting the data representation via an IO stack of the storage system to a common data block file system module of the storage system that is used for de-duplication processing.

16. The device according to claim 12, wherein the data representation and the second part are stored in a cache list in the cache region.

17. The device according to claim 11, wherein performing data feature detection by the programmable circuit on the first part comprises:

sampling the user-written data by the programmable circuit to determine the first part having a predetermined number of bytes;

detecting the first part using a hash table; and performing a bit-by-bit comparison between the first part and the predetermined data feature in response to the first part meeting a criteria for the detection.

18. The device according to claim 11, wherein the programmable circuit is implemented by a smart network card.

19. The device according to claim 11, wherein the predetermined data feature and the corresponding data representation are maintained in a predetermined list.

20. A computer program product having a non-transitory computer readable medium which stores a set of instructions to perform data processing; the set of instructions, when carried out by computerized circuitry, causing the computerized circuitry to perform a method of:

performing, according to a determination that a programmable circuit receives user-written data, data feature detection by the programmable circuit on a first part of the user-written data;

replacing, in response to the first part matching a predetermined data feature, the first part by the programmable circuit with a data representation corresponding to the predetermined data feature; and transmitting the data representation to a cache region of a storage system.

* * * * *